United States Patent Office 2,708,312
Patented May 17, 1955

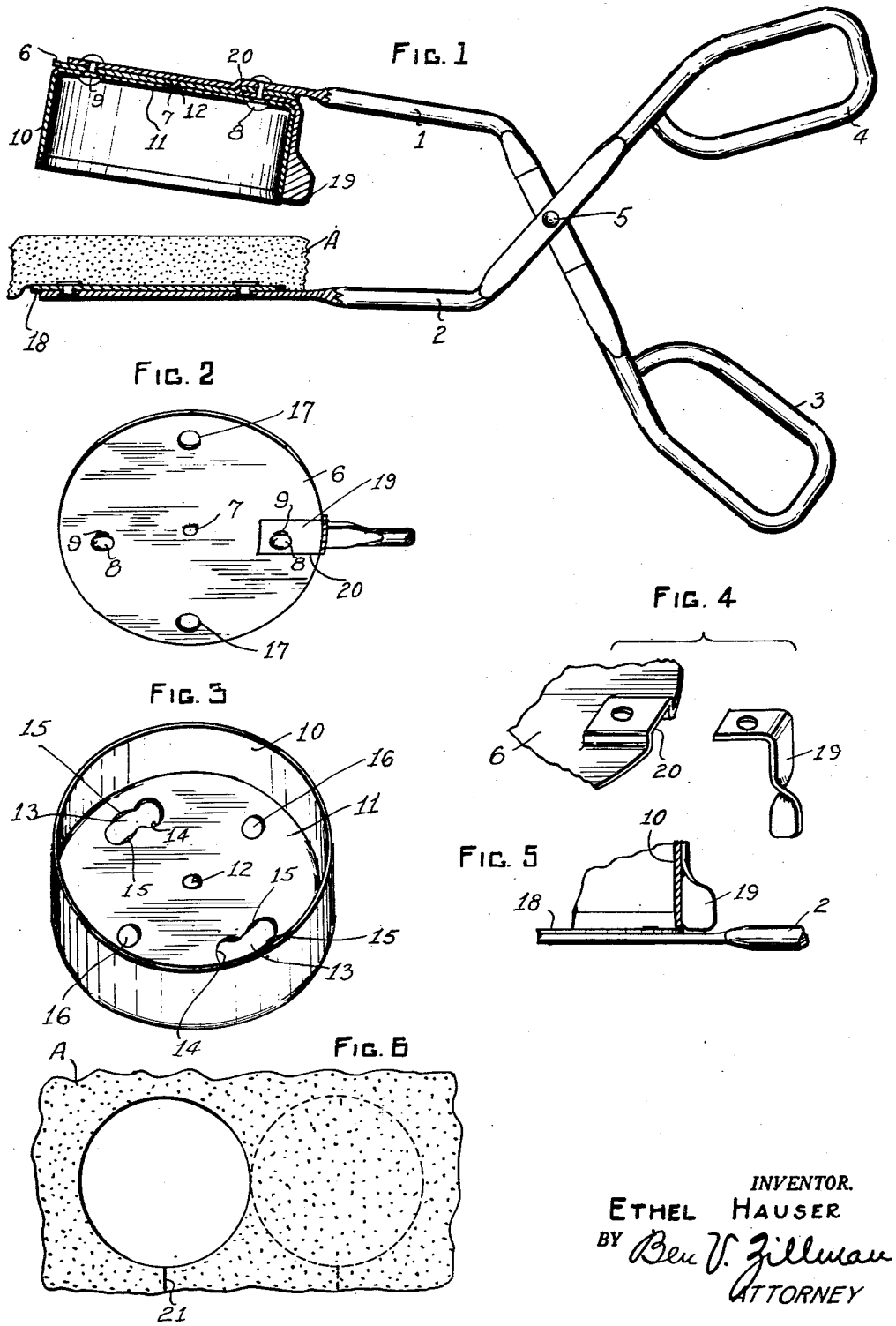

2,708,312
BISCUIT CUTTER

Ethel Hauser, St. Louis, Mo.

Application August 28, 1952, Serial No. 306,780

3 Claims. (Cl. 30—124)

This invention relates to kitchen tools generally, but more particularly to a cutter for cutting out predeterminedly-shaped pieces of dough from a sheet of dough, as for instance, in making biscuits or cookies, and has among its objects, the production of such a cutter that will be extremely easy to use, will cause a minimum of handling of the rolled dough in making such pieces and depositing them on the baking sheet or the like, be relatively inexpensive, strong and sturdy for its intended purpose through a long useful life, that may be operated with certainty and rapidity to cut successive, like-shaped pieces from said sheet, and which will be otherwise, safe, satisfactory and efficient for use wherever deemed applicable.

One of the principal objects of my invention is to so construct such a device, that the piece of dough thus severed from the dough sheet need not be picked up by hand, but on the contrary may be moved, while in the cutting device, to the pan or sheet for the subsequent baking operation.

Another object of the invention is to construct a device of the kind described, that will be quite small and compact, so as to occupy a minimum of storage space, and which may be easily and readily carried to the point of work, and be efficiently operated with one hand.

A further object of my invention is to construct such a device that the cutting element is detachably mounted thereon, so as to permit of using any one of a number of differently shaped cutters to be used at any time, thereby giving a wide range of designs to cover different seasons of the year and personal taste, to cookies or biscuits cut from the dough sheet.

An added object of the invention is to so construct a device of the kind described, that it will have a base or plate element thin enough to be slidably insertable beneath the dough sheet, and evenly and firmly support that portion of the sheet from which the piece is to be cut.

A still further object of my invention is to so construct a device of the kind described, in which there is a pair of pivotally interconnected levers, the outer portions of which provide operating handles, with a cutter element mounted on the other end of one of said levers, and with the dough-supporting plate element mounted on the corresponding end of the other lever, so that as said handles are operably manipulated, the cutter element is actuated toward and against the plate element to sever the predeterminedly shaped piece of dough from the sheet and retain it within said cutter element, to thus permit said piece to be carried to the desired place for depositing or emptying it into the pan or other baking utensil.

Another added object of the invention is to so construct such a device that it will have an auxiliary cutting element or tail piece mounted closely adjacent the main cutter element and movable together with the latter to cut the sheet along a line extending approximately rearwardly of the cutter element and in vertical registry with the adjacent portion of the lever to which the plate is mounted, so that as the tool is lifted after the cut, said adjacent portion of the lever will pass upwardly through the line thus provided in the dough sheet.

Many other objects and advantages of the construction herein shown and described, and the uses and advantages thus obtained, will be obvious to those skilled in the art to which this invention appertains, as will be apparent from the disclosures hereinafter given.

To this end, my invention consists in the novel construction, arrangement, combination and form herein shown and described, and the uses mentioned, and as will be more clearly pointed out in the following specification.

In the drawings, wherein like reference characters represent like or corresponding parts throughout the views, Figure 1 is a side elevation, with parts in cross-section, showing the device about to cut out a piece from a sheet of dough;

Figure 2 is a perspective view of the cutter-element carrying plate fixed to the forward end of the lever portion shown as uppermost;

Figure 3 is a perspective view of the detachably mountable cutter element for attachment to said carrying plate;

Figure 4 is an exploded fragmentary view of said carrying plate and the tail cutter element to be affixed thereto;

Figure 5 is a fragmentary side elevation, with a portion of the main cutter element shown in section, showing the cutting position of the tail cutting element; and Figure 6 is a plan view of the sheet of dough, having one of the pieces already removed therefrom, and showing in dotted lines the outline of the like piece to be next cut out.

Referring more particularly to the drawings, wherein I have illustrated a preferred embodiment of the invention, A indicates a sheet of dough, of composition suitable for making biscuits, cookies, or the like, already rolled to the desired thickness ready for having the shaped pieces removed therefrom for subsequent baking in a pan, sheet or the like.

With my improved kitchen tool, I am enabled to cut successive predeterminedly-shaped pieces out of this sheet of dough, and simply for the sake of clarity, the biscuits or cookies are to be circular in outline, as indicated.

There is a pair of levers 1 and 2, the rear ends of the same being fashioned to form the handles 3 and 4 respectively, and with said levers pivotally interconnected at 5, to permit manipulation of the tool with one hand.

To one of these levers, say at the forward end of the lever 1, is permanently mounted the plate element 6, shown most clearly in Fig. 2, in this instance being of circular outline, and having the air openings 17 therethrough, and a downwardly directed pin or lug 7 at its center. A pair of diametrically spaced rivets 8—8 are carried by said plate element, to detachably receive the cutter element or cup in a manner about to be described, said rivets having the shank portions 9 between the rivet head and the opposed surface of said plate. These rivets may be used to affix the said plate to said forward end of the lever 1, if desired, and as shown in this instance.

The cutter element or cup, in inverted position as shown herein, is shown most clearly in Fig. 3, and may be of any suitable or preferred outline to determine the shape of the portions of dough to be cut thereby, and in this instance is circular in outline, and of approximately the same diameter as that of the plate element 6, with the peripheral rim or flange 10 depending from the top 11 of said cup. Through the center of said cup top there is an aperture 12 through which the pin 7 projects in order to properly center said cup element relatively of said plate.

In addition, there are a pair of diametrically spaced arcuately-elongated apertures through said top, and indicated at 13—13, cooperating with the rivets 8—8 in order to detachably mount the cup element to said plate element. Each of said apertures 13 has one end radially enlarged, at 14, to permit of the head of the rivet 8 easily passing therethrough, it being understood that when mounting the cup in place, it is positioned so that both of said rivets pass simultaneously through the pair of enlarged openings 14—14, the aperture then being reduced in width so as to prevent passage of the rivet heads therethrough, but permit of the shank portions 9 of the rivets to slidably engage the side walls of said elongated apertures. Obviously, in mounting said cup, the latter is positioned centrally of the plate element, with the enlarged portions 14—14 of the apertures in registry with the rivets 8—8, whereupon the cup will seat on and against said plate element. A partial rotation of said cup will now bring the reduced ends of said apertures against the shank portions of said rivets. In order to aid in preventing accidental displacement of said cup element after the parts have been assembled as just mentioned, lip or rib portions may be struck up or otherwise formed along the side edges of said apertures, as indicated at 15—15, of about the height of the space between the rivet head and the opposed top wall of said plate, and which is also approximately the same as that of the thickness of the top wall of said cup element, to frictionally engage said rivets during the movement of attaching or detaching said cup to said plate. The cup element is also provided with a pair of air escape openings 16—16 to register with the similar openings 17—17 through said plate element, when the cup is in final assembled position.

To the forward end of the other lever there is affixed a spatula or plate element 18, of sufficient size to be engaged by the largest size of the cups or cutters intended to be used, so that as said element is slidably inserted immediately beneath the sheet of dough to support a portion of the latter on said element 18, the handles may be manipulated so as to bring the cutting rim of the cutter onto and against said plate element 18, to thereby sever a piece of dough from the sheet, corresponding in size and shape as predetermined by the size and shape of the cutter element, one such piece having been already cut from the sheet as indicated in full lines in Fig 6.

The piece so cut will be retained between the bottom plate element and the cutter element, and permit of emptying or depositing the cut piece into a pan or onto a baking sheet for subsequent baking operation, all without touching the piece after cutting is started.

Although it is possible for an operator to use such a tool so expertly that the pieces are cut exactly on the end of the dough sheet nearest the rear end of the cutter, yet it is not necessary to hew so close to the line in this instance, as I have provided an auxiliary cutter or tail piece 19 secured to the device, so as to form or cut a line through the dough to extend rearwardly of the cutter cup, and in vertical registry with the forward portion of the lever closest thereto, as indicated most closely in Fig. 5. This tail piece may be secured so as to be actuated simultaneously with the main cutter, in any preferred manner, as by seating it within a channel 20 of the element 6, with an opening to register with a similar one through said plate element 6, and through which one of the rivets 8 is inserted (as shown in Fig. 1). The lowermost edge or blade portion of said tail piece terminates closely adjacent the cutting rim of the main cutter and extends approximately in the same plane therewith. Obviously, in the event that the rear of the cutter cup is spaced from the corresponding edge of the dough sheet, as indicated in Figs. 1 and 6, the tail piece will cut through the dough sheet along the rearwardly extending line 21 to either sever the same therealong or appreciably weaken it along said line, so that after said biscuit has been cut, the lifting of the tool will separate the dough at either side of said line, to facilitate the lifting of the entire tool without interference with the dough.

In Fig. 6, in full lines, there is indicated that one biscuit has been entirely removed, with the tool having been lifted upwardly through the line cut by the tail piece.

In Fig. 6, in dotted lines, there is shown the appearance of the next biscuit that may be cut, assuming that the cutter is positioned about the same distance from the rear edge of the dough sheet. However, in the event that the tool is so positioned that the rear edge of the sheet is coincident with the rear edge of the main cutter, the cut will be made without any imprint of the tail piece blade on the sheet, and the tool may be lifted without engagement with the dough sheet.

Having thus described my invention, it is obvious that various immaterial modifications may be made in the same without departing from the spirit of my invention; hence I do not wish to be understood as limiting myself to the exact form, arrangement, construction, and combination of parts herein shown and described, nor the uses mentioned, except as limited by the state of the art to which this invention appertains, and by the claims hereunto appended.

What I claim as new and desire to secure by Letters Patent is:

1. In a device for cutting predeterminedly-shaped pieces of dough from a sheet, a pair of pivotally interconnected operating handles, a plate carried by one of said handles for insertion slidably beneath said sheet to support a portion of the latter thereon, a cutter having a rim of a predetermined shape carried by the other handle and adapted to be actuated through pivotal operation of said handles to engage said plate to sever said piece of dough and leave it deposited within said cutter upon withdrawal of the latter from said sheet, and a tail piece carried by said first handle and extending rearwardly from the cutting rim of said cutter, movable with said cutter toward said plate to cut the dough along a line extending rearwardly of the cutter.

2. In a device for cutting successive portions from a sheet of dough, a pair of pivotally interconnected operating handles, a plate carried by the forward end of one of said handles for insertion beneath said sheet, a cutter detachably carried at the forward end of the other handle and adapted to be actuated to engage said plate to sever a portion of dough between the plate and cutter, and a tail piece carried by said other handle, extending from closely adjacent the cutting edge of said cutter, lengthwise of said handle and operably actuated together with the cutter to be moved toward said first handle to cut the dough along a line extending lengthwise of said first handle.

3. In a device for cutting successive pieces of predetermined shape from adjacent areas of a sheet of dough, a plate element sufficiently thin to be slidably inserted immediately beneath said sheet to support a portion of the same, a tubular cutter element having its cutting rim opposed to said plate element, a pair of handles carrying said cutter and plate elements and movably interconnected for actuating the latter together to detachably sever said supported portion of the sheet in a predetermined shape, and a tail carried by said handle carrying said cutter element and movable toward the other handle and having a cutting blade lying substantially in the plane of the cutting rim of said tubular cutting element and extending rearwardly from closely adjacent said cutting rim beyond the latter rim and opposed to the adjacent opposed portion of said other handle.

References Cited in the file of this patent
UNITED STATES PATENTS

| | | |
|---|---|---|
| 1,020,865 | Wieber | Mar. 19, 1912 |
| 1,931,388 | Ling | Oct. 17, 1933 |
| 1,975,200 | Durrin | Oct. 2, 1934 |
| 2,182,726 | King et al. | Dec. 5, 1939 |
| 2,332,439 | Cordwell | Oct. 19, 1943 |
| 2,499,309 | Harris | Feb. 28, 1950 |

FOREIGN PATENTS

| | | |
|---|---|---|
| 120,557 | Sweden | Nov. 6, 1947 |